United States Patent
Ripoll et al.

(10) Patent No.: US 8,813,831 B2
(45) Date of Patent: Aug. 26, 2014

(54) AIR-CONDITIONING SYSTEM FOR VEHICLE WITH IMPROVED SUNSHINE CORRECTION

(75) Inventors: Christophe Ripoll, Viroflay (FR); Nicolas Deniaud, Saint Germain de la Grange (FR)

(73) Assignee: Renault S.A.S., Boulogne Billancourt (FR)

( * ) Notice: Subject to any disclaimer, the term of this patent is extended or adjusted under 35 U.S.C. 154(b) by 990 days.

(21) Appl. No.: 12/602,612

(22) PCT Filed: May 19, 2008

(86) PCT No.: PCT/FR2008/050858
§ 371 (c)(1),
(2), (4) Date: Dec. 8, 2009

(87) PCT Pub. No.: WO2009/000984
PCT Pub. Date: Dec. 31, 2008

(65) Prior Publication Data
US 2010/0212880 A1 Aug. 26, 2010

(30) Foreign Application Priority Data
Jun. 8, 2007 (FR) ..................... 07 55600

(51) Int. Cl.
*B60H 1/00* (2006.01)
*B60H 3/00* (2006.01)
*B61D 27/00* (2006.01)
*G05D 23/00* (2006.01)

(52) U.S. Cl.
USPC ............ 165/41; 165/42; 165/202; 165/287

(58) Field of Classification Search
USPC ............ 165/202, 287, 41, 42; 454/75
See application file for complete search history.

(56) References Cited

U.S. PATENT DOCUMENTS

| | | | |
|---|---|---|---|
| 4,491,727 A * | 1/1985 | Appelbaum et al. ......... 356/222 |
| 4,760,772 A | 8/1988 | Horiguchi et al. |
| 4,961,462 A * | 10/1990 | Iida et al. ..................... 165/204 |
| 5,016,815 A * | 5/1991 | Doi et al. ..................... 236/49.3 |
| 5,020,424 A * | 6/1991 | Iida et al. ......................... 454/75 |
| 5,072,105 A * | 12/1991 | Osawa ........................ 250/206.1 |
| 5,553,775 A * | 9/1996 | Kato et al. ................... 236/49.3 |
| 5,704,544 A * | 1/1998 | Samukawa et al. ........ 236/49.3 |
| 5,726,441 A | 3/1998 | Samukawa et al. |
| 5,755,378 A * | 5/1998 | Dage et al. ................... 236/91 C |
| 5,803,358 A * | 9/1998 | Ruettiger ..................... 236/91 C |
| 6,622,928 B2 * | 9/2003 | Tsunoda et al. ............. 236/91 C |
| 6,768,099 B1 * | 7/2004 | Cheng et al. .............. 250/227.24 |
| 6,966,498 B2 * | 11/2005 | Huang et al. ................ 236/91 C |
| 2004/0103675 A1 * | 6/2004 | Tomita ............................. 62/157 |

* cited by examiner

*Primary Examiner* — Judy Swann
*Assistant Examiner* — Ian Soule
(74) *Attorney, Agent, or Firm* — Oblon, Spivak, McClelland, Maier & Neustadt, L.L.P.

(57) ABSTRACT

An air-conditioning system for a vehicle, that includes a module for controlling the air-conditioning group for adjusting the temperature inside the passenger compartment to a setpoint temperature, the control module being capable of correcting the temperature adjustment in the passenger compartment based on a received sunshine value in the passenger compartment. The system further includes a mechanism correcting the sunshine value to improve the correction of the temperature adjustment inside the passenger compartment particularly in cloudy conditions.

14 Claims, 1 Drawing Sheet

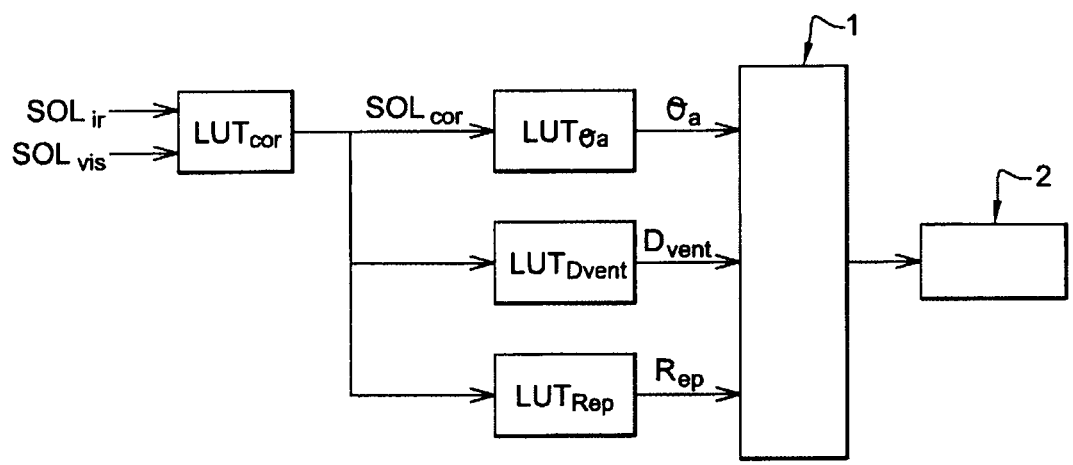

AIR-CONDITIONING SYSTEM FOR VEHICLE WITH IMPROVED SUNSHINE CORRECTION

BACKGROUND

The invention relates to an air-conditioning system for a vehicle, the system comprising an air-conditioning unit control module for regulating the temperature inside a passenger compartment toward a setpoint temperature, said control module being able to correct the regulation of temperature in the passenger compartment as a function of a value of insolation received in the passenger compartment.

Air-conditioning is becoming standard equipment in present-day vehicles, particularly air-conditioning of the "computer-controlled" type, which allows the user to set a desired comfort level by entering a setpoint into a control module of the air-conditioning unit.

A computer-controlled air-conditioning system such as this needs quickly and accurately to reach the comfort setpoint irrespective of the insolation received through the glazed parts of the passenger compartment, which may convey a significant amount of heat into the passenger compartment.

Some systems, described for example in patent document U.S. Pat. No. 4,760,772, take the received insolation into consideration using an infrared light sensor to compensate for the influence of solar radiation on the thermal comfort experienced by the occupants, and more particularly to take account of the angle of irradiation and the position of the sun above the horizon.

While these systems may prove satisfactory in clear weather, when the sky is overcast (cloudy), the light sensor then delivers the same information regarding the amount of incident radiation as it does in a cloudless sky even though the insolation is lower, particularly in the visible spectrum. This then results in over-compensation of the temperature regulation, which has the effect of the occupants feeling some discomfort, due to the blown air being at too cool a temperature.

BRIEF SUMMARY

It is an object of the invention to improve the aforementioned systems of the prior art and to address the disadvantages thereof, particularly to allow compensation of the regulation of the air-conditioning that is satisfactory both under clear sky and when the sky is overcast (cloudy).

It is an object of the present invention to provide an air-conditioning system for a vehicle of the aforementioned type and which comprises means of correcting this insolation value to improve the correction of the temperature regulation inside the passenger compartment particularly when the weather is overcast (cloudy).

An air-conditioning system such as this avoids the occupants experiencing discomfort due to over-compensation of the regulation of the temperature in the passenger compartment for the incident radiation whatever the cloud cover.

According to some particular embodiments, the air-conditioning system comprises one or more of the following features:

the insolation value supplied to the control module is a corrected insolation value determined from at least one value of insolation in the visible spectrum and one value of insolation in the infrared spectrum;

the corrected insolation value is obtained from a look-up table containing coefficients for correcting the value of insolation in the infrared spectrum as a function of a value of insolation in the visible spectrum;

the correction is applied to the value of insolation in the infrared spectrum when the values of insolation in the infrared are above a predetermined threshold and/or when the values of insolation in the visible are below a predetermined threshold;

the absorption spectra of a first cell of the insolation sensor sensitive to visible radiation, on the one hand, and of a second cell of the insolation sensor sensitive to infrared radiation have only a negligible area of overlap, and preferably have distinct absorption spectra;

the value of insolation in the visible spectrum is proportional to the radiation received in the passenger compartment at wavelengths of between 350 and 800 nm;

the value of insolation in the infrared spectrum is proportional to the radiation received in the passenger compartment at wavelengths of between 850 and 950 nm.

Another subject of the present invention is a method of air-conditioning a vehicle passenger compartment, in which method insolation values are measured using a sensor sensing insolation in the visible and in the infrared; the value of insolation in the infrared is corrected as a function of the value of insolation in the visible in order to obtain a corrected insolation value; at least one of the values representing a blown air temperature, a ventilation flow rate, a distribution of blown air flow rate is determined as a function of the corrected insolation value; the air-conditioning unit control module is controlled using at least one of the values representing a blown air temperature, a ventilation flow rate, a distribution of the blown air flow rate in order to adapt the temperature of the passenger compartment of the vehicle to the setpoint temperature.

According to some particular embodiments, the air-conditioning method comprises one or more of the following features:

the value of insolation in the infrared is corrected as a function of the value of insolation in the visible in order to obtain a corrected insolation value using a look-up table;

at least one of the values representing a blown air temperature, a ventilation flow rate, a distribution of blown air flow rate is determined as a function of the corrected insolation value using respective look-up tables.

It is an object of the present invention to propose an air-conditioning system for a vehicle of the afore-mentioned type.

BRIEF DESCRIPTION OF THE DRAWINGS

Further features and advantages of the invention will become clearly apparent from reading the following description of the nonlimiting embodiment thereof, in conjunction with the single FIGURE which, in the form of a block diagram, represents the way in which the insolation sensor according to the invention is used to correct the control of the air-conditioning system.

DETAILED DESCRIPTION

In the description which follows, it must be understood that the signal Sx is the signal representative of the physical value x.

The FIGURE, given by way of nonlimiting example, depicts a block diagram of the way in which the insolation sensor according to the invention is used to correct the control of the air-conditioning system.

An air-conditioning unit control module 1 comprising a computer and a heating, ventilation and air-conditioning (HVAC) unit, can be used to vary the temperature in a passenger compartment 2 of a motor vehicle by modifying the position of blown air mixing flaps according to parameters applied to it.

The system also comprises an insolation sensor, comprising a first cell sensitive to light emitted in the visible spectrum and a second cell sensitive to light emitted in the near infrared spectrum.

For preference, the first cell is sensitive to light emitted at wavelengths of between 350 and 800 nm. The radiated power in this spectrum will then be a function of the presence of clouds in the sky, this power therefore decreasing when there are clouds present.

For preference, the second cell is sensitive to light emitted at wavelengths of between 850 and 950 nm. The radiated power in this spectrum will therefore be constant whether or not there are any clouds in the sky.

Advantageously, the absorption spectra of the first cell, on the one hand, and of the second cell, on the other, have only a negligible area of overlap, and the absorption spectra are preferably distinct. If the sensitive materials of the cells have absorption spectra that extend over wider ranges than those previously mentioned, the cells may be fitted with passband optical filters adapted to the aforementioned ranges.

This sensor is directed toward the sky, so as to receive the incident solar radiation, and is preferably installed at the base of the windshield rear view mirror in order not to obscure the occupants' view.

This sensor therefore delivers a signal SSOLvis proportional to the insolation received by the first cell in the visible spectrum SOLvis and a signal SSOLir proportional to the insolation received by the second cell in the near infrared spectrum SOLir.

From these insolation values SOLir, SOLvis, a corrected insolation value SOLcor is determined that makes it possible to determine blown air temperature θa, ventilation flow rate Dvent and distribution Rep values. These values are preferably determined using look-up tables LUTθa, LUTDvent and LUTRep which have been predetermined for example in the way in which they are generally determined when only the value of insolation in the infrared SOLir is used to perform insolation compensation. In general, as the insolation increases, at least one of the operations including reducing the blown air temperature θa, increasing the blown air flow rate Dvent and modifying the distribution Rep is performed.

The corrected signal SSOLcor is obtained from a look-up table LUTcor on the basis of at least one out of the signal for insolation in the infrared SSOLir and the signal for insolation in the visible SSOLvis.

This look-up table contains correction coefficients, preferably ranging between 0 and 1, applied to the value of insolation in the infrared SOLir as a function of the value of insolation in the visible SOLvis.

These coefficients are determined by calibration by scanning through the ranges of values of insolation in the visible SOLvis and in the infrared SOLir and by determining a corresponding coefficient value that will allow the air-conditioning system to compensate the insolation to its correct value when the sky is completely overcast, that is to say to reduce the compensation.

Advantageously, the size of the table LUTcor can be reduced by applying a correction only above and beyond values of insolation in the infrared SOLir that are above a predetermined threshold and/or when the values of insolation in the visible SOLvis are below a predetermined threshold.

For example, when the value of insolation in the infrared SOLir is above a first predetermined threshold and the value of insolation in the visible SOLvis is below a second predetermined threshold, compensation due to insolation is carried out in the air-conditioning system: the corrected insolation value SOLcor is equal to the value of insolation in the infrared SOLir multiplied by the coefficient from the corresponding table LUTcor. This then yields a corrected insolation value SOLcor lower than or equal to the value of insolation in the infrared SOLir.

The following table provides one example of a look-up table LUTcor, giving the coefficients as a function of the values of SOLir and SOLvis:

| SOLvis | SOLir [W/m$^2$] | | | | |
|---|---|---|---|---|---|
| [W/m$^2$] | 0 | 100 | 400 | 600 | 1000 |
| 0 | 0 | 1 | 3/4 | 2/3 | 3/5 |
| 50 | 0 | 1 | 1 | 5/6 | 7/10 |
| 100 | 0 | 1 | 1 | 1 | 1 |

By contrast, when the values of insolation in the visible SOLvis and in the infrared SOLir are above a predetermined threshold, no compensation due to insolation is performed in the air-conditioning system.

It must be understood that the sensor may comprise a first cell and a second cell, these cells being sensitive in the near infrared spectrum, positioned laterally on each side of the cell that is sensitive to light emitted in the visible. A sensor such as this could then make it possible to differentiate between the temperatures of air blown by the air-conditioning system on the left-hand side and on the right-hand side of the passenger compartment 2. The control module 1 could then generate different temperatures on the left-hand side and on the right-hand side.

Advantageously, the sensor used to provide the values of insolation in the visible SOLvis and in the infrared SOLir is used for systems that control the switching-on of the lights and/or systems for starting the windshield wipers.

The invention claimed is:

1. An air-conditioning system for a vehicle, the system comprising:
 an air-conditioning unit control module that regulates temperature inside a passenger compartment toward a setpoint temperature, the control module configured to correct regulation of temperature in the passenger compartment as a function of a value of insolation received in the passenger compartment; and
 means for correcting the insolation value to improve correction of the temperature regulation inside the passenger compartment,
 wherein the insolation value supplied to the control module is a corrected insolation value determined from at least one value of insolation in the visible spectrum and at least one value of insolation in the infrared spectrum, wherein the sensor used to provide the insolation values is used for systems that control switching-on of lights of the vehicle or systems that start windshield wipers of the vehicle, and
 wherein the corrected insolation value is computed when the at least one value of insolation in the infrared spectrum is greater than a first predetermined threshold, or the at least one value of insolation in the visible spectrum is smaller than a second predetermined threshold.

2. The air-conditioning system as claimed in claim 1, wherein the sensor is an insolation sensor directed toward the sky to provide the values of insolation in the visible spectrum and in the infrared spectrum.

3. The air-conditioning system as claimed in claim 1, wherein the corrected insolation value is obtained from a look-up table including coefficients for correcting the at least one value of insolation in the infrared spectrum as a function of the value of insolation in the visible spectrum.

4. The air-conditioning system as claimed in claim 2, wherein the absorption spectra of a first cell of the insolation sensor sensitive to visible radiation and of a second cell of the insolation sensor sensitive to infrared radiation have only a negligible area of overlap, or have distinct absorption spectra.

5. The air-conditioning system as claimed in claim 1, wherein the at least one value of insolation in the visible spectrum is proportional to radiation received in the passenger compartment at wavelengths of between 350 and 800 nm.

6. The air-conditioning system as claimed in claim 1, wherein the at least one value of insolation in the infrared spectrum is proportional to radiation received in the passenger compartment at wavelengths of between 850 and 950 nm.

7. A method of air-conditioning a vehicle passenger compartment, the method comprising:
measuring insolation values using a sensor sensing insolation in the visible spectrum and in the infrared spectrum, the sensor being included in systems that control switching-on of lights of the vehicle or systems that start windshield wipers of the vehicle;
correcting the at least one value of insolation in the infrared spectrum as a function of the at least one value of insolation in the visible spectrum to obtain a corrected insolation value;
determining at least one of the values representing a blown air temperature, a ventilation flow rate, a distribution of blown air flow rate as a function of the corrected insolation value; and
controlling the air-conditioning unit control module using at least one of the values representing the blown air temperature, the ventilation flow rate, the distribution of the blown air flow rate to adapt the temperature of the passenger compartment of the vehicle to the setpoint temperature,
wherein the corrected insolation value is computed when the at least one value of insolation in the infrared spectrum is greater than a first value, or the at least one value of insolation in the visible spectrum is smaller than a second value.

8. The method of air-conditioning a vehicle passenger compartment as claimed in claim 7, in which the at least one value of insolation in the infrared spectrum is corrected as a function of the at least one value of insolation in the visible spectrum to obtain a corrected insolation value using a look-up table.

9. The method of air-conditioning a vehicle passenger compartment as claimed in claim 7, in which at least one of the values representing the blown air temperature, the ventilation flow rate, the distribution of blown air flow rate is determined as a function of the corrected insolation value using look-up tables, respectively.

10. The air-conditioning system as claimed in claim 3, wherein the corrected insolation value is lower than or equal to the at least one value of insolation in the infrared spectrum when the at least one value of insolation in the infrared spectrum is above the first predetermined threshold and the at least one value of insolation in the visible spectrum is below the second predetermined threshold.

11. The method of air-conditioning a vehicle passenger compartment as claimed in claim 7, wherein the corrected insolation value is lower than or equal to the at least one value of insolation in the infrared spectrum when the at least one value of insolation in the infrared spectrum is above the first predetermined threshold and the at least one value of insolation in the visible spectrum is below the second predetermined threshold.

12. The air-conditioning system as claimed in claim 1, wherein the corrected insolation value is lower than or equal to the at least one value of insolation in the infrared spectrum.

13. The air-conditioning system as claimed in claim 1, wherein when the at least one value of insolation in the visible spectrum and the at least one value of insolation in the infrared spectrum are greater than a predetermined threshold, the air-conditioning system does not compensate for insolation.

14. The air-conditioning system as claimed in claim 3, wherein the corrected insolation value is equal to the at least one value of insolation in the infrared spectrum multiplied by a corresponding coefficient from the look-up table.

* * * * *